Oct. 21, 1952

W. R. TUCKER 2,614,500

FLUID-OPERABLE CONTROL MECHANISM FOR
VARIABLE DELIVERY FLUID PUMPS

Filed Aug. 25, 1948

Inventor
Warren R. Tucker

By W. S. McDowell

Attorney

Oct. 21, 1952  W. R. TUCKER  2,614,500
FLUID-OPERABLE CONTROL MECHANISM FOR
VARIABLE DELIVERY FLUID PUMPS
Filed Aug. 25, 1948  3 Sheets-Sheet 2

Inventor
Warren R. Tucker

By
W. S. McDowell
Attorney

Patented Oct. 21, 1952

2,614,500

UNITED STATES PATENT OFFICE 2,614,500

FLUID-OPERABLE CONTROL MECHANISM FOR VARIABLE DELIVERY FLUID PUMPS

Warren R. Tucker, Mount Gilead, Ohio, assignor to H-P-M Development Corporation, Mount Gilead, Ohio, a corporation of Delaware Application August 25, 1948, Serial No. 46,058

4 Claims. (Cl. 103—38)

The present invention relates to hydraulic control systems for variable delivery radial piston-type pumps, and more specifically to an improved all-hydraulic control for radial piston-type pumps having a shiftable fluid flow-control member in the form of a shift ring movable between positions providing reversible full delivery and neutral or no fluid delivery.

In the past, control mechanisms utilized in controlling the various positions of the shift ring or flow-control member of a radial piston-type pump generally embodied an adjustable tension spring mechanism operable to shift the flow-control member in opposition to a servomotor assembly arranged to shift the flow control member in the opposite direction. A specific type of control of this nature is outlined in United States Patent No. 2,230,054 to Ernst, issued January 28, 1941.

The primary objection to previous controls of this general type arose through the inability to effect operation of such controls from remote positions with respect to the pump mechanism, that is to say, the operation of such controls required that an operator be stationed at or near the pump structure to adjust the spring tensioning and servomotor assemblies in accordance with the desired operation of a hydraulic press or other pump-operated mechanism.

Accordingly, it is an object of this invention to provide a control mechanism for fluid pumps having a shift ring or similar movable flow-control member which may be operated from a station disposed remotely from the pump mechanism.

It is another object of the present invention to provide an all hydraulically-actuated control which operates independently of spring mechanisms to shift or move the flow-control member of a fluid pump to positions providing for zero fluid displacement, full fluid displacement in one direction, full fluid displacement in the opposite direction, and intermediate stages of fluid delivery between zero and full fluid displacement.

It is yet another object of this invention to provide a hydraulically-actuated control for radial piston-type fluid pumps which is operable in response to a predetermined back pressure at the delivery side of the pump, such as is established when a pump-actuated ram or press reaches its full stroke limit, to automatically shift the flow-control member of the pump to a neutral or no delivery position regardless of the actual condition of the control-actuating mechanism, and to hold a fixed pressure level at the delivery side of the pump after being automatically returned to a neutral position.

Generally, the present invention makes use of a pilot-pump-operated hydraulic system embodying diametrically opposed fluid-actuated pistons arranged in a plurality of stages having different pressure areas, said pistons being arranged to cooperatively shift the flow-control member of an associated pump between its various delivery positions, with provision being made in the form of separate diametrically opposed plungers operating off the pump delivery for automatically shifting or returning the flow-control member of the pump to neutral in response to predetermined back pressures built up in the pump delivery system. In its more specific aspects, the present invention utilizes the pressure of a pilot pump-operated system to normally control the shifting movement of the shift-ring or flow-control member of a pump to its various positions or stages of fluid delivery, while the pressure of the pump circuit is utilized in opposition to the pilot pump-operated system to automatically shift the flow-control member to a neutral position upon the occurrence of a predetermined back pressure in the delivery side of the pump.

For a further and more detailed understanding of the invention and additional objects and advantages realized therefrom, reference is made to the following description and the accompanying drawings, wherein:

Fig. 4 is a longitudinal vertical sectional view of a four-way control valve utilized in the present control apparatus; and, Fig. 5 is a diagrammatic illustration of a modified single-acting control formed in accordance with the present invention.

Figure 1:
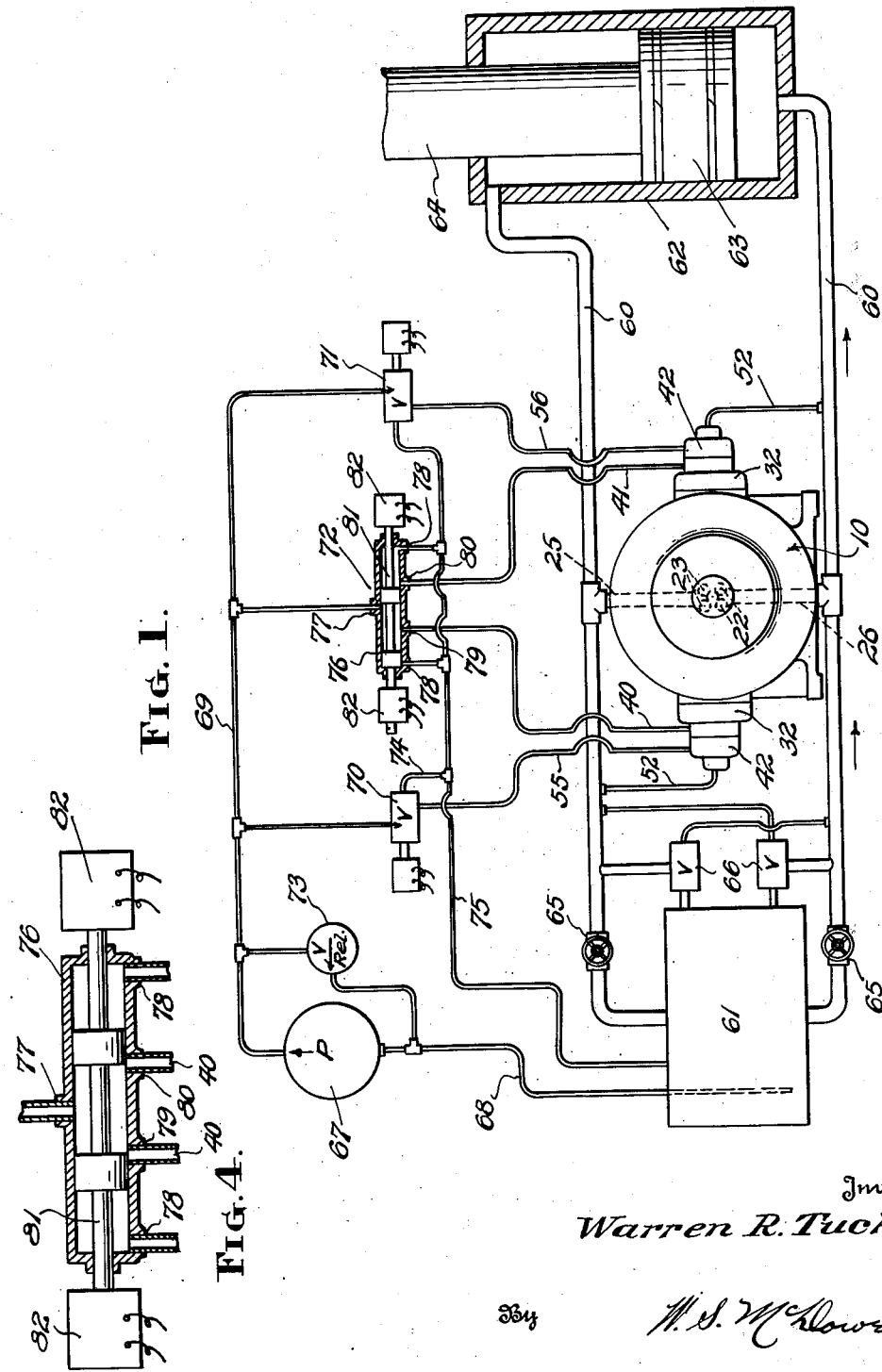
Fig. 1 is a diagrammatic illustration of the hydraulic circuit embodied in the present invention.

With reference to the drawings, it will be seen that the present invention is adaptable for use generally with reversible variable delivery fluid displacement pumps of the type having a shiftable fluid flow-control member which is movable to a plurality of fluid delivery stages so that the pump may deliver pressure fluid up to a certain pre-determined pressure, the flow-control member generally comprising what is known as "a shift ring" whose relative positions with respect to a driven rotor determines the operability of a plurality of radially disposed fluid-displacing plungers or pistons. Pumps of this general nature are used extensively in connection with relatively high-pressure hydraulic systems, such as are used to operate hydraulic presses and the like.

In the drawings, the numeral 10 generally represents a radial piston-type pump provided with an outer casing 11 formed internally with a pair of diametrically opposed bosses 12 having flat surfaces 13 for reciprocably supporting the shift ring or flow-control member 14 of the pump, bearing plates 15 being inserted between the mating portions of the bosses 12 and the shift ring 14. Rotatable within the shift ring 14 of the pump is a secondary ring 16 which provides a track way for the outer end portions or heads 17 of a plurality of radially disposed pistons 18. The pistons 18 are reciprocable in radially arranged bores 19 which are formed in a primary rotor or cylinder barrel 20 around a fixed pintle 21. The pintle 21 is provided with a plurality of cut-away regions communicating with longitudinal pairs of ports 22 and 23, through which fluid is conveyed to and from the cylinder bores 19 by means of ports 24 disposed at the inner end of the bores 19. In turn, the respective pairs of ports 22 and 23 communicate with supply and discharge conduits 25 and 26 respectively, which extend exteriorly of the pump casing. It will be understood, that the details of construction of the pump mechanism, as herein outlined, form no part of the present invention and may consist of one of a number of different types or constructions of pumps, with the exception of the shift ring 14 or an equivalent shiftable flow-control member.

The shift ring 14 is provided upon its outer surface with a pair of diametrically opposed flat bosses 27 which lie in abutting engagement with the outer ends with a pair of diametrically opposed piston heads or plungers 28 which are slidably mounted within bores 29 formed in the sides of the outer casing 11 of the pump. The outer casing 11 is formed with flat side regions 30, to which are attached, as by bolts 31, the cooperatively flat faces of a pair of inner piston housings 32. The housings 32 are formed with centrally disposed bores 33 which provide continuations of the bores 29, and slidably support the enlarged end portions of the plungers 28. Toward their outer ends, the piston housings 32 are formed with relatively enlarged bores 34 in which are slidably mounted a pair of annular piston members 35 which are, in turn, slidably carried upon the reduced shank portions 36 of the plungers 28. At their extreme outer ends, the housings 32 are provided with another and still enlarged set of bores 37 which terminate at the flat outer ends of the housings 32 and communicate with the second bores 34. The housings 32 are further formed with fluid inlet openings 38 which communicate with passages 39 leading to the enlarged outer end bores 37 of the housings. Positioned within the inlet openings 38 of the inner housings 32 are fluid conduits 40 and 41.

Arranged in mating engagement with the outer flat ends of the housing 32 are the cooperatively flattened inner ends of a pair of outer piston housings 42. The outer housings 42 are formed with axially disposed bores 43 of a relatively greater diameter than the bores 37, whereby the outer end portions of the inner housings 32 provide annular shoulders 44 at one end of the bores 43. The outer ends of the bores 43 communicate with relatively reduced recesses 45, whose reduction in diameter provides a second set of shoulders 46 at the outer ends of the bores 43.

Slidably mounted within the bores 43 for wiping engagement with the walls thereof are a pair of annular blocks or pistons 47, each of which is provided with an axial opening 48 through which extend a pair of fluid-pressure-responsive piston plugs 49, the outer ends of which are slidably mounted within bores 50 formed in the outer end housings 42, with the inner ends of the plugs 49 being maintained in abutting engagement with the reduced end portions of the plungers 28. The reduced bores 50 of the outer housings 42 terminate in relatively enlarged fluid inlet ports 51 which receive the ends of a pair of fluid supply conduits 52. The outer end housings 42 are further provided with fluid-conducting passages 53 which communicate respectively with the recesses 45 and a pair of fluid inlet ports 54 for the reception of fluid conduits 55 and 56. Extending through the outer ends of the plugs 49 and communicating with the recesses 45, are a pair of restricted T-shaped relief passages 57 which prevent hunting movement of the plugs upon application of relatively extreme pressures thereto. As with the connection between the outer casing 11 and the inner housings 32, the outer end housings 43 are connected with the inner end housings 32 by means of screw threaded bolts 58, and liquid-tight engagement between the two housings is aided by an annular packing ring 59 disposed within an annular recess formed upon the inner faces of the outer housings 42.

Connected with the fluid inlet and outlet 25 and 26 of the pump 10 are a pair of fluid-conducting manifolds 60 which communicate at one of their ends with a liquid reservoir 61, and at their opposite ends with the respective ends of a hydraulic press cylinder 62. In the usual manner, a piston 63 is mounted for sliding movement within the cylinder 62 for wiping engagement with the inner walls thereof. The piston is provided with an axially disposed piston rod or plunger 64 which extends exteriorly of the cylinder 62 to join a press-operated member, such as one platen of a press, not shown. Interposed within the conduits 60, between the reservoir 61 and the pump 10, are check valves 65 by means of which fluid flow may normally be curtailed in a direction toward the reservoir. Also interposed between each of the conduits 60 and the reservoir 61 are a pair of safety valves 66 which function to automatically return fluid from the conduits 60 to the reservoir 61 when overloading conditions occur within the conduits due to the displacement of a relatively large quantity of fluid from the cylinder 62 which normally cannot be handled through the pump 10. It will be understood, that the immediately preceding description of the pump hydraulic circuit is common to the ordinary press-actuating hydraulic circuit, and in its specific aspects, forms no part of the present invention.

The pump 10 operates, depending upon the position of the shift ring 14, to displace fluid through either of the conduits 60 at varying pressure levels ranging from zero delivery to full delivery. When the shift ring 14 occupies a position concentric with the axis of the pintle 21, there is no reciprocation of the piston plungers 18 of the pump, and consequently no fluid delivery through either of the inlet or outlet conduits 25 and 26. As the shift ring 14 is moved in a direction to the right, as viewed in Fig. 2, reciprocation of the pistons 18 follows, and fluid is drawn from the ports 23 and displaced through the ports 22 and out of the discharge conduit 26, from whence to the advancing area of the cylinder 62 to work upon the larger area face of the piston 63 and cause extension of the plunger 64. During advancing movement of the piston 63, fluid disposed within the retracting area of the cylinder 62 is forced outwardly through the opposite conduit 60 to be drawn into the pump 10 by way of the inlet conduit 25, and excess fluid displaced from the return area of the cylinder 62, which may not be taken through the pump, is returned to the reservoir 61 by way of the safety valve 66 associated with the return conduit 60. When the shift ring 14 occupies an extreme right-hand position as viewed in Fig. 2, a maximum of fluid displacement is obtainable through the outlet conduit 26. By the same token, as the shift ring 14 is moved to the extreme opposite left-hand position, as viewed in Fig. 2, the direction of flow is reversed and a maximum displacement is had through the inlet 25. Lower fluid displacement levels are obtainable by positioning the shift ring 14 at intermediate stages between neutral and the two full delivery positions.

Referring now to Fig. 1 of the drawing, it will be seen that the present improved control system makes use of a pilot pressure-operated hydraulic system which embodies a relatively low-pressure pilot pump 67 provided with an intake conduit 68 in communication with the fluid reservoir 61. Communicating with the delivery side of the pilot pump 67 is a pressure manifold 69 which supplies fluid under pressure of the pilot pump 67 to a pair of three-way valves 70 and 71, and a four-way valve 72. Interposed between the intake conduit 68 and the delivery manifold 69, in bypassing relationship to the pump 67 is a pressure relief circuit including a pressure relief valve 73 which functions in response to a predetermined maximum back pressure within the delivery manifold 69 to return fluid to the intake side of the pump 67.

The three-way valve 70 connects the pressure manifold 69 of the pilot pump with the fluid supply conduit 55 which communicates with the passage 53 formed in one of the outer end housings 42 of the shift ring control. The valve 70 is further provided with an exhaust line 74 which communicates with a fluid-return manifold line 75 leading to the reservoir 61. The three-way valve 70 is of the two position type, and is operable to selectively join the inlet conduit 55 with the delivery manifold 69, or with the return conduit 74, whereby fluid under pressure may be introduced directly from the pump 67 to the recess 45 and bore 43 of the left-hand outer piston housing 42 to act upon the exposed area of the piston 47 or whereby fluid within the bore 43 and recess 45 may be exhausted therefrom through the return line 74. The three-way valve 71 is identical to that of the valve 70, and functions in the same manner to control the passage of fluid to and from the bore 43 and recess 45 of the right-hand outer end housing 42.

The four-way valve 72 is of the three position type which embodies an outer casing 76 formed with a fluid inlet 77, a pair of fluid outlets 78, and a pair of motor ports 79 and 80. Slidably carried within the valve casing 76 is a spool-type valve plunger 81 which is selectively shiftable to a first position effecting simultaneous communication between the delivery manifold 69 of the pump 67 and the two fluid inlet conduits 40 and 41 which communicate with the respective bores 34 and 37 of the inner piston housings 32. The second position of the valve plunger 81 is obtained by shifting the same to an extreme right-hand position whereby communication is had between the pressure manifold 69 and the inlet conduit 41, while the opposite inlet conduit 40 is connected with one of the outlets 78 to permit fluid return to the reservoir. The third position of the valve is obtained by shifting the plunger 81 to an extreme left-hand position whereby communication is had between the pressure manifold 69 and the inlet conduit 40, while the opposite conduit 41 is connected with the other outlet 78 of the valve. Thus, the valve 72 enables fluid under pressure of the pump 67 to pass simultaneously through the inlet conduits 40 and 41, or alternately through one or the other of the conduits 40 or 41 while the opposite conduit is open to exhaust by way of the return manifold 75.

Advantageously, the plunger 81 of the valve 72 may be shifted to its various positions by means of electrical solenoids 82 connected with the respective ends of the plunger which extend outwardly from the ends of the valve casing 76. The solenoids 82 are alternately energizable to shift the plunger to either of its two extreme positions, while spring means, not shown, associated with the solenoids 82 may be utilized to normally position the plunger 81 in its neutral position effecting simultaneously communication of the pump with the conduits 40 and 41.

In operation, the shift ring 14 of the pump is moved to its neutral or concentric position with respect to the axis of the pintle 21 by actuation of the valve 72 to an intermediate position, whereupon fluid under pressure of the pilot pump 67 is introduced simultaneously to the inlet conduits 40 and 41, which, in turn, conduct pressurized fluid into the bores 37 to act upon the exposed faces of the reduced shank portion 36 of the plungers 28 and the outer faces of the annular piston rings 35. Thus, the effective areas upon which the equalized pressures act are equal when the shift ring 14 occupies a neutral position, and should the shift ring 14 be moved in either direction away from a neutral position, an imbalance of effective pressure areas in the piston stages 34 and 36, due to the relative mobility of the plungers 28 and the piston rings 35, will obtain which causes the equalized pressures to shift the ring to a neutral position.

Figure 2:
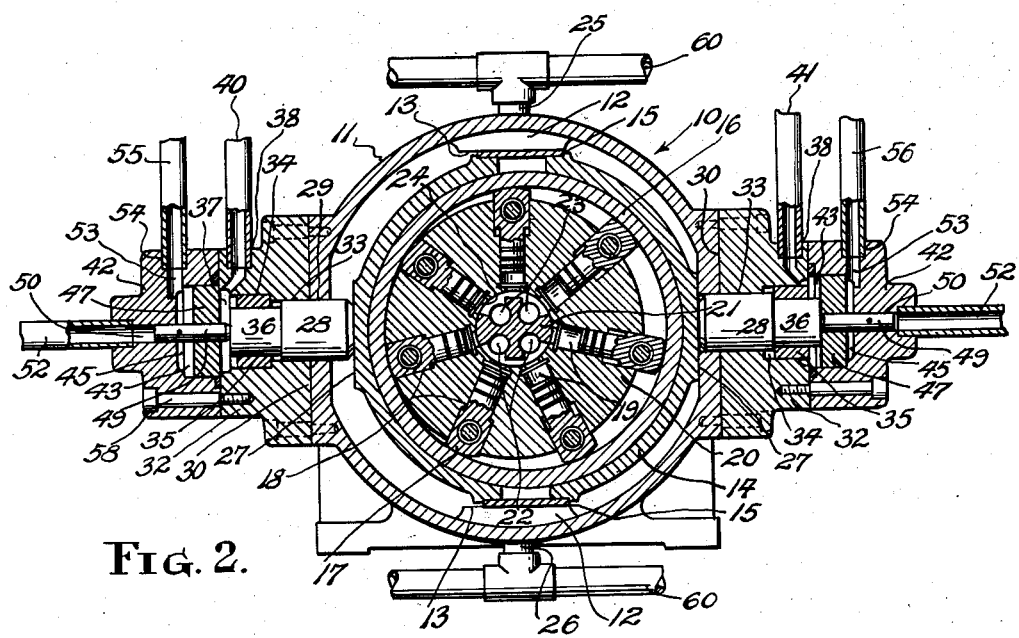
Fig. 2 is a medial vertical sectional view taken through a radial piston-type pump and the shift ring control apparatus of the present invention.
Figure 3:
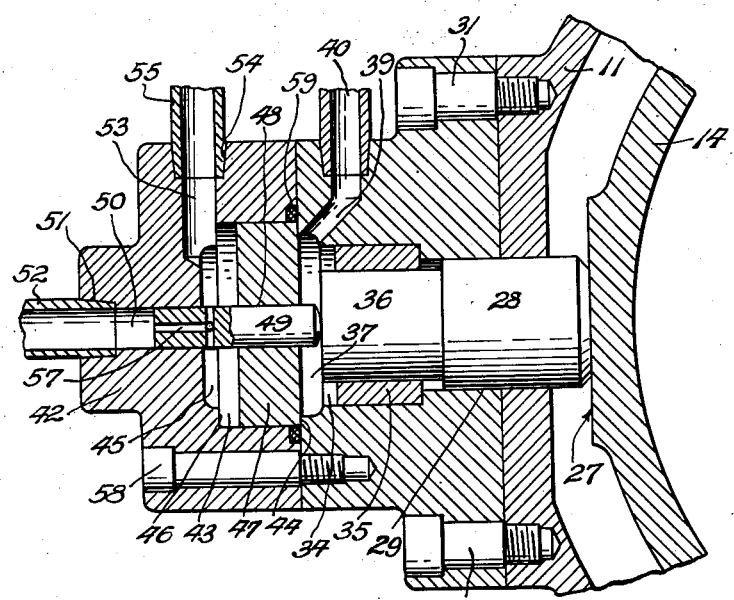
Fig. 3 is an enlarged fragmentary vertical sectional view of one of the piston sections of the present control apparatus.

To shift the flow-control member or shift ring 14 to its extreme right-hand position, the valve 72 is actuated to a position permitting the passage of pressure fluid from the pump 67 to the inlet conduit 40, while the opposite inlet conduit 41 is connected with one of the fluid outlets 78 of the valve. In this position, fluid under pressure of the pump reacts upon the exposed faces of the reduced portion 36 of plunger 28 and the piston ring 35 of the left-hand inner housing while fluid within the opposite or right-hand inner housing is exhausted by way of the conduit 41. To shift the ring back to a neutral position from this extreme full displacement position, the valve 72 is shifted to its intermediate position permitting pressurized fluid to simultaneously act upon the unseated right-hand piston ring 35 and the faces of the reduced shank portions 36 of the plungers 28, and due to the larger effective pressure area within the right-hand housing, provided both by the piston ring 35 and the plunger 28, the right-hand plunger 28 and piston ring 35 will move in opposition to the opposite plunger to move the shift ring once again to its neutral position. Referring to Figs. 2 and 3, it will be seen that the extent of outward movement of either of the plungers 28 is determined by the positions of the relatively larger annular pistons 47. Normally, to permit the shift ring 14 to move to its full displacement position, the valves 70 and 71 are conditioned to permit fluid to freely exhaust through the conduits 55 and 56 whereby the pistons 47 may be pushed outwardly into engagement with the shoulders 46 upon outward movement of either of the plungers 28. To hold the shift ring 14 against movement into a full displacement position in either direction, fluid under pressure may be introduced alternately or simultaneously through either of the conduits 55 or 56 to react upon the outer faces of the pistons 47 to hold the same in abutting engagement with the shoulders 44. This latter position provides a limit stop for the outer ends of the plungers 28, and due to the relatively larger effective pressure area of the pistons 47, and the same pump pressures reacting thereon as act upon the opposite piston stages 35 and 36, the pistons 47 will be effective, in opposition to the opposite plunger 28, to hold the shift ring in intermediate positions between neutral and full displacement positions. These intermediate positions are extremely advantageous when the associated pump-actuated mechanism takes the form of a hydraulic press or the like, in that the advancing stroke of the piston 63 and its associated plunger 64 may be reduced in speed, by decreasing the delivery level of the associated pump. Where slow speeds are desirable, either of the valves 70 or 71 may be actuated to pressurize the chamber within the outer-end housings 42 adjacent the pistons 47 to limit the outward movement of the adjacent plunger 28. At any time when increased speeds are required or desired, the pressure acting upon the pistons 47 may be relieved by conditioning the valves 70 and 71, so as to allow fluid within the outer-end housings 42 to exhaust or return to the reservoir, at which time the plungers 28 are free to move the shift ring to either of its extreme full delivery positions.

Acting in opposition to the movement of the plungers 28 are the relatively small diameter plugs 49 which are pressurized by fluid within the main pump circuit. It will be understood, that the pressures within the main pump circuit are of a substantially increased value relative to the pressures afforded by the pilot pump circuit. Accordingly, due to the relatively reduced effective pressure areas of the plugs 49 in relation to the pressure areas of the plungers 28, the pilot pressure acting upon the pressure areas of the pistons 28 and 35 is predetermined so as to normally overcome the pressure exerted by the plugs 49 to freely move the shift ring 14 to its various fluid-displacement positions. However, as relatively extreme back pressures are built up within the delivery of the pump 10, such as will occur when the piston 63 reaches the ends of its compression or return strokes, the diameter of the plugs 49 is so computed in relation to a predetermined back pressure, that the same are oper-
able to exert sufficient force upon either of the plungers 28 in opposition to the opposite plunger to return the shift ring to a neutral position, at which time the back pressures are reduced by the consequent reduction in pump pressure. Thus, an automatic return of the pump to a neutral position is afforded when back pressures of a predetermined magnitude are established at the delivery side of the pump. It should here be noted, that should leakage occur within the delivery side of the pump circuit, the pressure acting upon either of the plugs 49 will be decreased to once again permit the pilot pump-actuated plungers to come into play and shift the ring into a position causing displacement of fluid by the pump. In this manner, a balance between the pilot pump system and the main pump system is effected whereby substantially constant pressures will be maintained at the delivery side of the pump, regardless of leakage or slippage within such delivery side.

Figure 5:
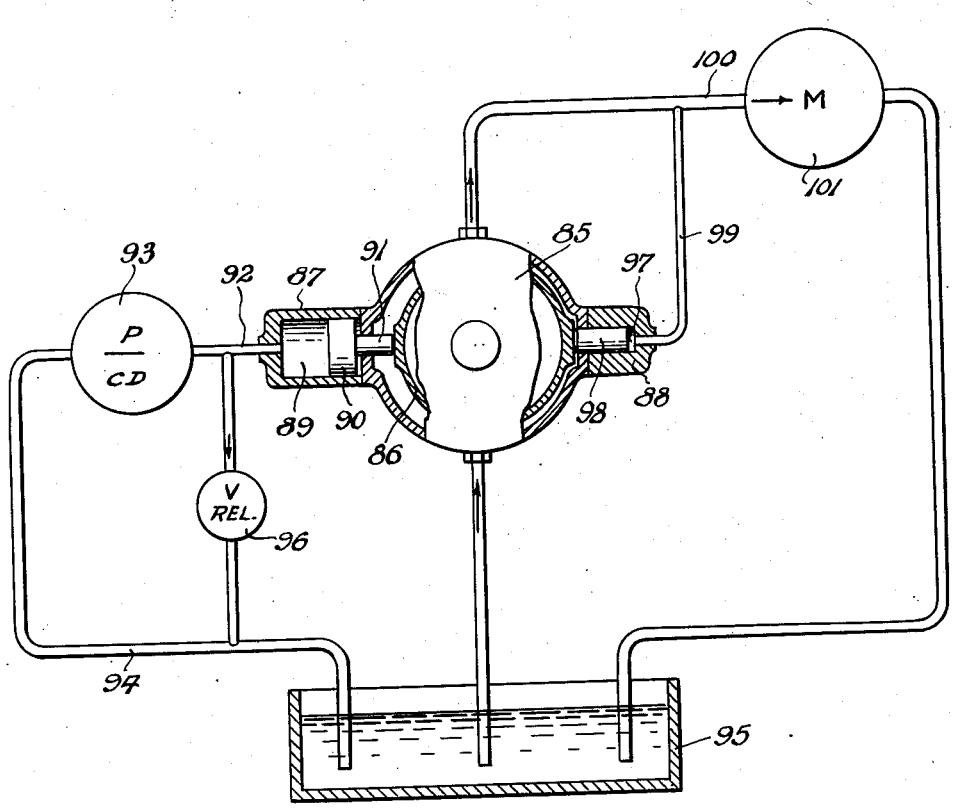

Fig. 5 of the drawings discloses in simple diagrammatic form a unidirectional variable delivery fluid pump, generally indicated by the numeral 85, having a shiftable flow-control member 86 movable between a neutral no-delivery position and a single full-delivery position. Arranged on opposite sides of the pump 85 are a pair of piston housings 87 and 88. The left-hand housing 87 is formed with an internal bore 89 of relatively large diameter in which is slidably mounted a reciprocable pressure-responsive piston 90 having a piston rod or plunger 91 extending through the pump casing for abutting engagement with one side of the flow-control member 86. Communicating with the bore 89 of the housing 87 is a fluid inlet conduit 92 which is directly connected with the delivery of a relatively low-pressure pilot pump 93, the latter being provided with a fluid supply line 94 extending within a fluid reservoir 95. Interconnecting the fluid inlet conduit 92 and the supply line 94, is a pressure relief circuit including a pressure relief valve 96 which functions in the usual manner in response to a predetermined maximum pressure within the delivery of the pump 93 to by-pass fluid from the inlet conduit 92 to the supply conduit 94 for recirculation by the pump. From this assembly, it will be seen that the piston 90 is constantly subjected to a predetermined pump pressure tending to force the flow-control member 86 to its full-delivery position.

The opposite housing 88 is formed with a relatively reduced diameter bore 97 in which is mounted a small diameter piston 98 which extends through the pump casing for engagement with the opposite side of the flow-control member of the pump 85. The bore 97 is connected by way of a fluid inlet conduit 99 with the delivery line 100 of the pump 85, on the pump side of a fluid-actuated motor 101. Thus, the piston 98 is at all times subjected to the pressure within the delivery line 100.

From this relation of elements it will be seen that by proper determination of the relative effective pressure areas of the pistons 90 and 98, the fluid delivery of the pump 85 will at all times maintain a substantially constant predetermined pressure upon the motor 101, as the piston 98 will be effective to shift the flow-control member of the pump toward its no-delivery position in opposition to the pilot pump-responsive piston 90 and in response to a predetermined maximum pressure within the delivery of the pump 85.

In view of the foregoing, it will be seen that the present invention provides highly efficient apparatus for controlling the fluid delivery of variable delivery pumps. Control mechanisms formed in accordance with this invention provide for critical remote control over the operation of variable delivery pumps which has heretofore been impossible or impractical with previously known control systems. Controls of the present invention are further characterized by their function of providing positive means to alternate the speed of delivery of an associated pump, and through the provision of means to automatically control the maximum pressure output of the pump and to maintain such maximum pressure output regardless of leakage or slippage within the mechanism operated by such pump.

While present preferred embodiments of the invention have been disclosed in detail it will be manifest that various modifications as to structural details are possible without departing from the spirit of the invention or the scope of the following claims.

I claim:

1. A control device for a variable delivery fluid pump having a flow-control member shiftable between opposite full delivery positions and a neutral no-delivery position, comprising a plurality of opposed fluid-actuated plungers arranged on opposite sides of the flow-control member of said pump and operable individually to shift the flow-control member to either of its full-delivery positions and operable in unison to shift the flow-control member to its neutral position, fluid pressure-responsive stop devices engageable with said plungers for limiting the shifting movement of the flow control member of said pump, said stop devices being operable in opposition to the influence of said plungers to limit the shifting movement of the flow-control member to intermediate positions between its neutral and full-delivery positions, and oppositely disposed piston means engageable with said plungers and responsive to a predetermined delivery pressure of said pump for shifting the flow-control member of said pump from a fluid-delivery position toward a no-delivery position in opposition to the influence of said plungers.

2. A control mechanism for a variable delivery fluid pump having a flow control member shiftable between two full-delivery positions and an intermediate no-delivery position, comprising a plurality of opposed servomotor casings arranged on opposite sides of the pump and provided with a plurality of internal pressure chambers each having fluid inlets, a plurality of opposed fluid-pressure-responsive plungers slidably mounted in one set of said chambers and engageable with the flow-control member of the pump on opposite sides thereof, valve means to selectively direct pressure fluid simultaneously to each of the chambers containing said plungers or separately to each of the chambers while connecting the opposite chambers to exhaust, a plurality of relatively increased area fluid-pressure-responsive stop devices mounted for limited reciprocating movement in another set of said chambers adjacent said plungers, said stop devices being operable in response to fluid pressure acting thereon to limit the sliding movement of said plungers under influence of fluid pressure, and a plurality of reciprocable pistons slidable within said casings and arranged in abutting engagement with said plungers and operable in response to a predetermined output pressure of the pump to move said plungers in opposition to fluid pressure acting thereon in a direction to shift the flow-control member of the pump to its no-delivery position.

3. In a combination with a variable delivery fluid pump having a pressure outlet and a flow control member in said pump shiftable between opposite full delivery positions and an intermediate no-delivery position, a control device comprising a pair of opposed, relatively low pressure, fluid-actuated plungers engageable with the flow control member of said pump on opposite sides thereof for shifting the same to either of its full delivery positions or to its no-delivery position; a pair of relatively low pressure, fluid-actuated stop members engageable with said plungers for limiting the shifting movement of the flow control member of said pump to hold the same against the action of either of said plungers in intermediate positions between no-delivery and full delivery positions, said stop members having increased effective pressure areas in relation to said plungers; fluid pressure-supplying means connected to supply pressure fluid to said pair of plungers and to said pair of stop members, said last named means including valve means selectively operable to direct pressure fluid simultaneously to both of said pair of plungers, or alternately, to one or the other of said pair of plungers and to selectively direct fluid pressure to said pair of stop members; and a pair of opposed pump pressure-operated pistons engageable with said plungers for shifting the flow control member of said pump from its full delivery positions toward its no-delivery position against the action of either of said plungers and in response to a predetermined delivery pressure of said pump, said pistons having decreased effective pressure areas in relation to said plungers.

4. In combination with a variable delivery fluid pump having a pressure outlet and a flow-controlling member carried in said pump and movable between a neutral position providing for no circulation of fluid through the pressure outlet of the pump and a full delivery position providing for maximum displacement of fluid through the outlet of the pump; a control device comprising a pair of cylinder-forming casings positioned on opposite sides of said pump; a first set of fluid-pressure-responsive plungers carried in the respective casings and engageable with said flow-controlling member for shifting the latter between neutral and full delivery positions; a second set of fluid-pressure-responsive stop members positioned in the respective casings and engageable with said first set of plungers, said second set of stop members being operable, when simultaneously subjected to fluid pressures, to maintain said first set of plungers in positions to hold said flow-controlling member in a neutral position; a third set of fluid-pressure-responsive stop members carried in the respective casings and having larger pressure-responsive areas than said first set of plungers and said second set of stop members and operable, in response to fluid pressure, to limit movement of said first set of plungers in shifting said flow-controlling member from its neutral position toward its full delivery position; a pilot pump circuit connected to supply pressure fluid respectively to said first set of plungers and said second and third sets of stop members, said circuit including valve means operable to direct pressure fluid either simultaneously or selectively to said first set of plungers, said second set of stop members, and said third set of stop members; and fluid-pressure-responsive means in said casings engageable with said first set of plungers and communicating with the pressure outlet of the pump for shifting said flow-controlling member toward its neutral position in opposition to forces exerted thereon by said first set of plungers in response to a given high pressure within the pressure outlet of said pump.

WARREN R. TUCKER.

REFERENCES CITED

The following references are of record in the file of this patent:

UNITED STATES PATENTS

| Number | Name | Date |
|---|---|---|
| 2,038,272 | Ernst | Apr. 21, 1936 |
| 2,142,500 | Douglas | Jan. 3, 1939 |
| 2,179,071 | Wiedmann | Nov. 7, 1939 |
| 2,230,054 | Ernst | Jan. 28, 1941 |
| 2,304,831 | Kendrick | Dec. 15, 1942 |
| 2,391,996 | Muller | Jan. 1, 1946 |
| 2,418,532 | Waldie | Apr. 8, 1947 |